Patented May 4, 1937

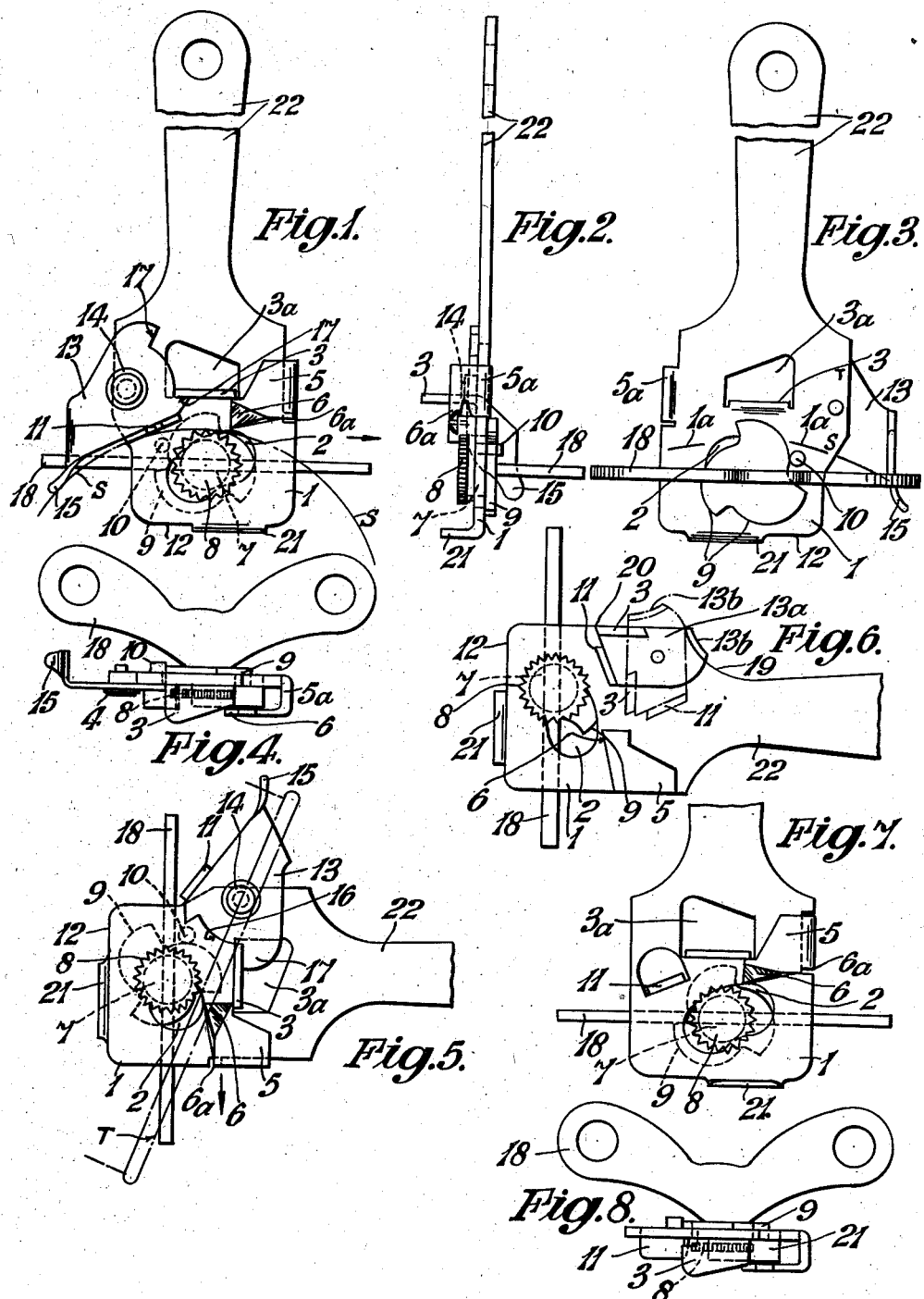

2,079,271

UNITED STATES PATENT OFFICE 2,079,271

TIN OPENER

Harry Ayliffe, Purley, England

Application June 22, 1936, Serial No. 86,539
In Great Britain January 11, 1935

4 Claims. (Cl. 30—3)

My present invention relates to devices for opening tins and more particularly to the class of device in which a toothed or serrated rotary member carried by a suitable plate is adapted to traverse the seamed or beaded rim of a tin, in conjunction with a relatively fixed bar-like cutting member as distinct from the heretofore proposed rotary disc cutter. In one such device as heretofore proposed the plate carries at one edge an integral cutter in the form of a lug bent over-hook fashion and adapted at its sharpened free edge to be applied to the flat or disc end of a tin in conjunction with another lug bent at right angles from the same edge of the plate, this latter lug forming an abutment adapted to slide along the rim of the can, the toothed or serrated disc being carried by a rotary pin passing through an arcuate slot in the plate, the shape of the slot, combined with cam projections on the rotary pin engaging a fixed stop, causing the toothed or serrated disc to move towards the rim of the tin and bite against it as it is rotated, whereby the cutting edge of the cutter is forced into the metal of the tin as the rotary member traverses the tin. Such a device is particularly suited for cutting inside the rim of a tin at its top, but other devices which can also be used for cutting the circumference of the cylindrical wall of a tin beneath its rim have heretofore been proposed, in one of which the said plate is bent into two limbs L shape, one limb carrying a serrated disc rotated on a fixed axis by a pair of wings adapted to be held in the operator's fingers, the other limb pivotally supporting a segmental plate with a few teeth and a cutter at its free edge adapted to be brought successively into engagement with the rim bead of the tin, the teeth in advance of the rim. However, as the rim beads of tins vary in thickness and form, such an arrangement is not entirely satisfactory, and the cutter is liable to wobble after considerable use as it is not rigidly carried by the L shaped plate.

The chief object of my present invention is to provide a simple yet strong form of tin opener of the type first specified which can be relied upon to cut cleanly round the circumference of a tin in such manner as to obviate distortion or corrugating of the cut edge whereby the contents of a container may be cleanly removed. Another object of this invention is to provide a tin opener which when used to cut around the circumference of a tin will have the cutting part firmly supported and so related to the circumference of the tin that an easy sliding cutting action on the metal results, as this is desirable when cutting the circumference of a thin sheet cylindrical container because the metal is not firmly supported (as at the top or disc part) at the circumference as the cutting progresses.

Another object of this invention is to combine an improved arrangement of abutments with the said plate of the said type of tin opener, so that in addition to the circumference of a tin being easily cut, the top or disc like end can be cut in already known manner, should this alternative form of cutting be required.

According to this invention the avoidance of corrugation or distortion of the edge produced by cutting around the circumference of the tin is obtained by a special configuration and arrangement of the cutter, the said cutter therefore being in the form of a bar or tongue rigidly carried by the said plate and having one edge shaped and adapted to lie close against the circumference of the tin to be cut, one end of said edge being formed as a cutting corner, the arrangement being that said cutting corner is the trailing end of said edge when the device is in use, and part of said edge in advance of the cutting corner serving to so guide the cutting corner over the sheet metal as to effect an easy sliding cutting action of the cutting corner.

In an embodiment of this invention a tin opener comprises a plate, a slot in said plate, a pin rotatable and translatively movable in said slot, a serrated disc fixed on the said pin, a cam fixed on the said pin, a projection on said plate against which bears said cam, all e. g. as previously proposed, a fixed cutter bar above said slot carried by one edge of said plate and overhanging and spaced from one side of the plate, said cutter bar having a lower edge in juxtaposition to the periphery of said disc, and a lateral lug like abutment on said plate beneath said slot adapted to bear against the top of the tin when the circumference is being cut, the free end of said lower edge being sharpened to form a cutting corner and the remainder of such edge being inclined at a small angle, e. g. 15° to said abutment, so that it can slide substantially tangentially over the circumference of a tin, and a further abutment above said slot adapted to lie substantially tangentially against the rim bead of the tin when the circumference is being cut.

In order that my invention may be clearly understood and readily carried into effect I have appended hereto a sheet of drawings illustrating embodiments thereof, and wherein:—

Figs. 1, 2, 3 and 4 are front, side, rear elevation and plan views respectively of a cutter in which one of the abutments is adjustable, the cutter being shown set to cut along the circumference of the container.

Fig. 5 is a front view showing the device set for cutting along the top of the container.

Fig. 6 is a front view showing a modification in which two abutments appropriate to cutting along the top and circumference of the container are carried by a single adjustable member.

Fig. 7 is a broken front elevation view of a further modification in which all of the abutments are integral with the main plate of the device, and Fig. 8 is a plan view of Fig. 7.

Referring to the drawing the embodiments shown each incorporates a metal plate 1 of substantially square outline, and an arcuate slot 2 is formed in such plate extending nearly diagonally across the plate. Projected laterally from the plate is a lug like abutment 3 adapted when the device is used for cutting the disc end of a container to lie against the upper side of the usual rib at the end of the container, this upper side of the rib being indicated at T in Fig. 5. This abutment can be pressed out of the member 1 so as to leave hole 3a. Projecting laterally from one edge of the plate is a cutter bar 5 which is formed integral with the plate by being bent over U-shaped as at 5a (see Fig. 4) so as to have a cutting edge 6 directed inwards and overhanging the plate 1, said cutter having the cutting edge located close to the upper end of the arcuate slot 2. Slidable along the arcuate slot 2 is a short thick pin 7 formed with a flange or disc shaped head 8 having peripheral teeth adapted to bite into the tin so that by rotating the pin 7 the cutter can be fed along the tin. To obtain the desired biting action the said pin has fixed thereto a plate formed with a pair of opposed or as shown a trefoil arrangement of cam shaped surfaces 9 adapted to slide over a lateral projection 10 formed on the side of the said plate reverse to that side where the cutter, serrated rotary member and first mentioned abutment are located. The important feature of this invention is that the device has the relatively fixed cutter bar 5 so shaped and located that it can be employed for cutting a tin round its circumference near one end in a clean and easy manner. Co-operating with the cutter bar for this purpose a further abutment 11 is provided and is adapted to bear by its lower face (i. e. looking at Fig. 1) tangentially against the outer side or periphery of the rim of the container (indicated by the dotted line S) so as to be tangential therewith, the point 6 of the cutter 5 bearing against the circumference of the container. This point 6 is in rear of the lower edge of the cutter bar 5 which is blunt for the greater portion of its length and so shaped and located that it bears smoothly against the container as it traverses the circumference thereof, so that the cutting corner 6 is drawn as a pointed cutter over the metal and cuts it in such manner as to avoid buckling the metal. This arrangement of cutter is important, because if a cutter is simply pressed chisel edged fashion directly into the metal at the circumference, not only will it corrugate the metal as it is traversed, but a substantial period before it can reach the final cutting stage the thin sheet metal of the container will have so buckled, and the resistance to the traversing of the device round the tin will be so great as to render it practically impossible to cut the container completely around its circumference. In any event a clean cut would be impossible if a chisel edged cutter is pressed for the full length of the cutting edge into the sheet metal. The further abutment 11 is inclined at an angle relative to the lower edge 12 of the plate 1, the angle of this abutment conveniently being about 30°. The abutment 11 can be a straight edged lateral projection bent up from a pivoted plate 13 firmly supported by a riveted over pivot pin 14 passed through the plate 1. This plate 13 has a finger piece 15 by which it may be swung to bring the abutment 11 into the operative position shown in Fig. 1 or to the inoperative position shown in Fig. 5. The pivoted plate 13 has an arcuate edge 16 which can ride over the adjacent end edge of the abutment 3, such edge terminating in a pair of short radial edges 17 adapted to abut against opposite sides of the abutment 3 thereby providing a firm support for the pivoted plate. In order to assist the operator in deciding which position to set the pivoted plate 13 the back of the plate 1 can have marked thereon the letters S and T as shown in Fig. 3 the intention being that the finger piece 15 should be pressed towards S for setting the device to cut the side or circumference of a container, and towards the letter T for cutting the top or disc end of the container, arcuate marks or grooves 1a can also be formed on the back of the plate 1 to indicate approximately the direction of the rim of a circular container to be cut when the abutment 11 is to be used. The cutter 6 has a cutting edge which is inclined at about 13° to the edge 12 of the plate 1, such inclined edge having a pointed lower end to form the cutter and a rounded inner surface at its upper corner 6a, this corner being stepped relatively to the bend 5a of the cutter bar as shown in Fig. 2 to facilitate its movement over the tin. The cutter is fed by the toothed rotary member 8 in the direction of the arrow. The pin carrying the cam member is formed with a pair of wings 18 or other suitable handle by which it can be rotated by hand.

As shown in Fig. 6 the abutments 3 and 11 may be carried by a common pivoted plate 13a having a bent over finger piece 13b adapted, as shown in full lines, to abut against an edge 19 of the plate when the abutment 11 is in use, and against the end edge 20, as shown in dotted lines, when the abutment 3 is in use.

To firmly support the lower edge 12 of the plate 1 during either form of cutting operation a lug 21 is bent up from such edge adapted to bear and slide against the top of a container when the circumference is being cut and against the circumference when the top is being cut.

A handle 22 is preferably provided integral with the plate 1 to facilitate manipulation when the circumferential wall of a container is being cut, the handle 22 being held in one hand and the wings 18 in the fingers of the other hand.

In the arrangement shown in Fig. 8 the lugs 11 and 3 are integral with the plate 1, the lug 11 being shorter than the lug 3 and spaced beneath it a sufficient distance to enable the beaded rim of a tin to pass easily between them when the lug 3 is bearing against the top of the tin when the cutter is removing such top. The lower face of the lug 3, i. e. that opposite the periphery of the disc 8, bears tangentially against the outer side of the rim when the circumference of the tin is being cut.

Although I have shown flat lug like abutments 3 and 11 it is to be understood that in place of them short thick pins may be fixed in the plate 1 instead of, as shown, pressing out the lugs from the plate 1 or plate 1 and plate 13.

It will be seen that in all of the forms shown the abutment 11 which engages the rim of the tin when cutting the circumference of a tin is arranged on the plate 1 at an oblique angle, as also is the lower edge of the cutter bar 5. These angles are such that the lug 11 will lie tangentially across the rim of the tin and will therefore slide smoothly around the rim, and the lower edge and cutting point of the cutter bar will form the most suitable angle with the circumference of the tin for ensuring a good cutting action. In this respect it will be seen that a simple example of my invention suited for cutting around the circumference of a tin comprises the plate 1, the arcuate slot 2 having an upper end close to the cutting edge 6 so that the slot lies somewhat diagonally across the plate, a substantially correspondingly inclined lug like abutment 11, and the lug like lower abutment 21 in relation to which the said slot and abutment 11 are diagonally arranged, the said slot supporting for a movement of translation the rotary pin 7.

What I claim is:—

1. A tin opener comprising a plate, a slot in said plate, a pin rotatable and translatively movable in said slot, a disc with a serrated periphery and a number of cam edged lobes fixed on said pin, means for rotating said pin, a lateral projection on said plate adapted to be engaged by said lobes to effect a movement of translation of said pin along said slot during its initial rotation, a cutter and a pair of abutments carried by said plate on one side of said slot, one of which abutments is adapted to bear against the top of the rim of the tin when the top is being cut, and the other against the periphery of the rim of the tin when the circumference is being cut, means for moving one of said abutments relatively to said plate into and out of operative positions, a handle formed in prolongation with said plate, a finger piece for adjusting said relatively movable abutment, location marks on the said plate for indicating the setting of the finger piece, and a lateral abutment carried by the plate on the opposite side of said slot adapted to bear against the tin during either cutting of the circumference or the top of the tin.

2. A tin opener comprising a plate, an inclined slot in said plate, a pin rotatable in said slot, means on one end of the pin for rotating it, a cam plate fixed on the pin and an abutment on the plate with which the periphery of the cam plate engages to impart a movement of translation of the pin along the slot, a cutter bar fixed to said plate and bent over from one side of the plate, a cutting edge on said bar, said cutting edge comprising a cutting trailing corner, a thick non-cutting portion adapted to traverse the circumference of the tin and located in advance of a cutting trailing corner, an abutment projecting laterally from said plate adapted to engage the periphery of the tin, and a toothed disc fixed on said pin adapted to engage the rim of the tin for transversing the cutting member along the tin.

3. In a tin opener, a plate, an arcuate slot in said plate, a pin rotatable in the slot, a cam plate on the pin and an abutment on the pin engaged by the periphery of the cam plate for imparting a movement of translation to the pin simultaneously with its rotation, a bar-like member extending from a vertical edge of the plate, a blunt lower edge on said bar-like member shaped to ride upon the circumference of a tin, a trailing cutting corner at the rear end of said blunt lower edge in proximity to the upper end of said slot, and a pair of abutments on said plate for engaging the tin disposed one above and one below the said slot, the upper abutment being adapted to slide upon and to be located substantially tangentially with respect to the rim of the tin and the other upon the top of the tin.

4. Tin opener for removing the top and rim of a tin and for cutting a disc out of the top of a tin comprising a metal plate, an inclined slot in the plate, a bar-like finger projecting from a vertical edge of the plate and bent over so that its free end is located substantially opposite the upper end of said slot, a serrated disc disposed beneath said free end, a pin in said slot and carrying said disc, means to simultaneously rotate said pin and move it translatively along said slot towards said free end of said finger, a trailing cutting corner at the lower corner of said free end of said finger, a blunt lower edge on said finger in advance of the cutter corner shaped to travel over the circumference of the tin, an abutment projecting laterally from a lower edge of the said plate and a further pair of abutments disposed above said slot alongside said finger one of which is adapted to be engaged with the upper side of the rim of the tin when cutting inside the top of the tin, and the other being adapted to be engaged with the periphery of said rim when removing the top and rim of the tin.

HARRY AYLIFFE.